United States Patent Office 3,591,539
Patented July 6, 1971

3,591,539
VINYLATED URETHANE OILS
Stephen F. Hudak, Minneapolis, Minn., assignor to
Ashland Oil, Inc., Houston, Tex.
No Drawing. Filed May 14, 1969, Ser. No. 824,662
Int. Cl. C08f 25/00
U.S. Cl. 260—23                                    7 Claims

ABSTRACT OF THE DISCLOSURE

A coating resin and the process for preparing it comprising the steps of:
(1) reacting 30% to 60% of a drying oil, at least 5% of the oil containing conjugated double bonds, e.g., safflower oil, dehydrated castor oil, with 2% to 25% of an aliphatic polyhydric alcohol, e.g., glycerol, pentaerythritol; and then
(2) adding and reacting up to 30% by weight of an organic polyisocyanate, e.g., toluene diisocyanate, 4,4' - methylene-bis(cyclohexylisocyanate); and then
(3) adding and addition polymerizing 15% to 60% of an ethylenically unsaturated monomer, e.g., styrene, vinyl toluene;
all percentages based on the solid weight of the product.

DISCLOSURE OF THE INVENTION

This invention relates to vinylated urethane oils. More particularly, this invention relates to the reaction product of an oil containing conjugated double bonds, e.g., safflower oil with a polyol, e.g., pentaerythritol. The product obtained is subsequently reacted with a polyisocyanate, e.g., toluene diisocyanate and this product, in turn, is vinylated with an ethylenically unsaturated monomeric compound or a mixture thereof. This invention further relates to the process of preparing these novel resinous materials.

The end products of this invention are resinous, non-wrinkling, fast air drying or baking industrial finishes with excellent gloss, alkali and water resistance, flow, odor and overspray characteristics. These properties make the resinous products of this invention ideal as automotive finishing and refinishing coatings.

Industrial finishes, particularly automobile finishes, must possess a set of qualities which are extremely difficult to obtain. For instance, it is desirable to have a coating material which dries rapidly under atmospheric conditions. Yet, it is imperative that the coating be glossy, smooth, and non-wrinkling. On the other hand, such qualities are not sufficient since the coating must also be water resistant and stable toward climatic conditions. Often these qualities are mutually exclusive, that is, where one or more exists the others do not and quality in one area must be sacrificed to achieve acceptable qualities in another aspect.

It is, therefore, an object of this invention to provide a novel resinous material which is generally suitable in all its properties for use as an industrial or automotive finish.

It is a more particular object of this invention to provide a resinous coating material which has a rapid air dry and yet has non-wrinkling characteristics.

Still another object of this invention is to provide air dry coatings which have high gloss, good alkali and water resistance and overspray characteristics.

Still other objects of this invention will be apparent from the foregoing discussion.

Broadly stated, this invention comprises a novel resinous material useful for coating compositions, comprising the reaction product of a oil having conjugated double bonds with a polyol, which product is subsequently reacted with a polyisocyanate and finally addition copolymerized with one or more ethylenically unsaturated monomers.

Based on the total weight of the finished-polymer, the components comprise the following parts by weight:

|   | Parts by wt. |
|---|---|
| (1) Oil component containing at least 5% of the oil having conjugated double bonds | 30–60 |
| (2) Polyhydric alcohol component containing at least 75% of triol or higher polyhydroxy compound | 2–25 |
| (3) Organic polyisocyanate | Up to 30 |
| (4) Ethylenically unsaturated monomer | 15–60 |

The initial step of the reaction comprises the alcoholysis of the drying oil with the aliphatic polyhydric alcohol and is conducted at a temperature of 400° F. to 600° F. and preferably 480° F. to 520° F. as is well-known in the alkyd art. Upon cooling, the alcoholized product is reacted with an organic polyisocyanate by the incremental addition of the polyisocyanate at a temperature of 100° F. to 400° F., preferably 150° F. to 375° F. (depending on the reactivity of the polyisocyanate) over a period of time from about 15 minutes to 60 minutes. In order to facilitate the reaction between the alcoholysis product and the polyisocyanate, catalysts known to the art can be employed, e.g., dibutyl tin dilaurate, dibutyl tin dichloride, dibutyl tin diacetate, etc.

The final step of the process involves the addition polymerization reaction between the so-called urethane oil produced in the first two steps and an ethylenically unsaturated monomer. This is a conventional polymerization reaction and is normally conducted at a temperature of about 200° F. to 400° F., preferably 250° F. to 350° F.

In order to facilitate the copolymerization of the ethylenically unsaturated monomer with the urethane oil, it is preferred that a polymerization initiator be incorporated in the composition. In general, it is preferred to employ about 0.001% to about 2.0% by weight of the polymerization initiator based on the weight of the total composition. The type and exact amounts of these polymerization initiators, which can be used, are well-known in the art, and any material which normally induces polymerization between unsaturated materials may be utilized. The optimum reaction conditions are modified to some extent by the choice of the particular catalyst used in the process. A very active catalyst should be used in lower concentration, and preferably at lower temperature, than a less reactive material. The catalysts that are preferably employed comprise a wide variety of organic super oxides, i.e., organic peroxides and hydroperoxides. Mixtures of peroxides and hydroperoxides including commercially available mixtures such as methyl ethyl ketone peroxide, cyclohexanone peroxide, and the like are especially effective polymerization initiators. Examples of organic peroxides that may be employed among others acetyl peroxide, benzoyl peroxide, substituted benzoyl peroxides, and particularly halogenated benzoyl peroxides such as p-bromobenzoyl peroxide, 2,4-dichlorobenzoyl peroxide, etc., benzoyl acetyl peroxide, phthalyl peroxide, succinyl peroxide, fatty oil acid peroxides such as coconut oil peroxide, lauroyl peroxide, styralyl peroxide, oleoyl peroxide, anisoyl peroxide, toluoyl peroxide, and the like. Organic peracids such as peracidic acid and perbenzoic acid can also be employed. Among the organic hydroperoxide catalysts that can be employed are tertiary butyl hydroperoxide, cumene hydroperoxide, diisopropyl benzene hydroperoxide, 1-hydroxycyclohexylhydroperoxide, the terpene oxides such as ascaridole and 1-p-methanehydroperoxide. Various other types of polymerization catalysts may also be employed, e.g., compounds such as aluminum chloride, stannic chloride, boron trifluoride, or the azo-type catalysts such as α,α'-azobis isobutyronitrile.

The starting materials used in the preparation of the resins of this invention are oils containing conjugated double bonds. Examples of such oils include, conjugated safflower oil, dehydrated castor oil, tung oil and oiticica oil. Other drying oils or combinations of drying and nondrying oils can be used providing that the major part of the oil charge is derived from oils containing ethylenic unsaturation and preferably that at least 5% by weight of the total oil charge contains conjugated double bonds. Among the other oils which may be admixed with the conjugated oils include cotton seed oil, soya bean oil, castor oil, peanut oil, corn oil, sunflower oil, poppy seed oil, linseed oil, marine animal oil, and the like. In general, it is most preferred that the oil containing conjugated double bonds comprise at least about 20% of the total oil charge.

The polyols used in alcoholysis preferably contain at least three hydroxyl groups. Among the useful polyols that may be mentioned, pentaerythritol, glycerol, 1,2,6-hexanetriol, 1,1,1,-trimethylolpropane, 1,1,1-trimethylolethane, 3-(2-hydroxyethoxy)-1,2-propane diol, 3-(2-hydroxypropoxy)-1,2-propane diol, 6-(2-hydroxyethoxy)-1,2 - hexanediol, 2,4-dimethyl-2-(2-hydroxyethoxy)-methyl-pentane diol-1,5-mannitol, 1,1,1-tris(2-hydroxypropoxymethylpropane) and the like. Diols such as ethylene glycol, propylene glycol, polypropylene glycols, ester diols, neopentyl glycol, and the like can comprise up to about 25% of the polyol alcoholysis charge. Mixtures of various triols and other polyhydroxy are likewise contemplated. It is preferred, however, that 75% to 100% of the polyol charge be comprised of triols or higher polyhydroxy compounds.

In general, any of the common polyisocyanates may be used in the formation of the urethane oil. The amount of polyisocyanate can vary widely up to about 30% by weight of the product, e.g. 1–30%. Among the suitable polyisocyanate compounds are the following:

3-isocyanato-methyl-3,5,5-trimethylcyclohexyl isocyanate
toluene-2,4-diisocyanate
3-phenyl-2-ethylenediisocyanate
1,5-naphthalenediisocyanate
cumene-2,4-diisocyanate
4-methoxy-1,3-phenylenediisocyanate
4-chloro-1,3-phenylenediisocyanate
4-bromo-1,3-phenylenediisocyanate
4-ethoxy-1,3-phenylenediisocyanate
2,4'-diisocyanatodiphenyl ether
5,6-dimethyl-1,3-phenylenediisocyanate
2,4-dimethyl-1,3-phenylenediisocyanate
4,4'-diisocyanatediphenyl ether
benzidinediisocyanate
4,6-dimethyl-1,3-phenylenediisocyanate
9,10-anthracenediisocyanate
4,4'-diisocyanatodibenzyl
3,3'-dimethyl-4,4'-diisocyanatodiphenylmethane
2,6-dimethyl-4,4'-diisocyanatodiphenyl
2,4-diisocyanatostilbene
3,3'-dimethyl-4,4'-diisocyanatodiphenyl
3,3'-dimethoxy-4,4'-diisocyanatodiphenyl
1,4-anthracenediisocyanate
2,5-fluorenediisocyanate
1,8-naphthalenediisocyanate
1,3-phenylenediisocyanate
methylene-bis(4-phenylisocyanate)
2,6-diisocyanatobenzylfuran
2,4,6-toluenetriisocyanate
2,4,4'-triisocyanatodiphenyl ether
1,4-tetramethylenediisocyanate
1,6-hexamethylenediisocyanate
1,10-decamethylenediisocyanate
1,3-cyclohexylenediisocyanate
4,4'-methylene-bis(cyclohexylisocyanate).

Examples of other representative isocyanates which can be used are described in U.S. 2,683,730, U.S. 2,292,422, and U.S. 2,929,794. Mixtures of any of the foregoing organic polyisocyanates can also be employed.

The final step of the reaction involves a copolymerization of the urethane oil with an α,β-ethylenically unsaturated compound or a mixture of such ethylenically unsaturated compounds. These can be selected from the well-known vinyl monomers, for instance, esters of unsaturated acids, the vinyl aromatic monomers, and other monomers such as vinyl chloride, acrylonitrile, methacrylonitrile, acrylamide and the like. Among the ester monomers that may be mentioned, are, methylacrylate, methylmethacrylate, ethylacrylate, diethylfumarate and the like. The vinyl aromatic compounds useful in this invention include:

styrene
alpha methyl styrene
vinyl naphthalene
di-vinyl benzene
alpha chloro styrene
vinyl pyridine
vinyl pyrrolidone
para chlorostyrene
para trichloromethyl styrene
para fluorostyrene
vinyl toluene and the like. Mixtures of the above ethylenically unsaturated materials may advantageously be used.

As mentioned previously, the resinous materials prepared by the method of this invention are primarily of interest as coating resins. They may be utilized in a variety of compositions alone or with other resinous materials and the addition of such agents such as pigments, driers, extenders, plasticizers, ultraviolet light stabilizers, solvents, and drying oils. The formulation of suitable resins into paints and coating compositions is well-known in the art. Though the products of this invention find particular use in air drying applications it should be understood that these materials have shown very satisfactory performance in general industrial baking applications, either by themselves or more commonly when blended with aminoplast resins, e.g., urea-formaldehyde, methoxylated melamines, butylated melamine-formaldehyde, melamine formaldehyde and other crosslinking resins well-known to the art. Satisfactory baking schedules include 30 minutes at 200–250° F. and 10–15 minutes at 275–300° F. It should be understood, furthermore, that the urethane oils of this invention, i.e., the non-vinylated base resins, find very satisfactory use as air drying and baked coatings. They are generally slower drying, softer and more flexible as compared to the final vinylated products. These urethane oils are especially useful in trade sales and aminoplast modified, industrial applications.

An important and novel feature of this invention is that at no time is acid used as a reactant, consequently, the acid number of the products is essentialy zero. The carboxyl-free products exhibit superior chemical (especially alkali) resistance and are useful in conjunction with zinc-rich primers where carboxyl groups would be undesirable or detrimental.

When properly formulated, the resinous materials of this invention may be applied by procedures such as dipping, brushing, or spraying to a variety of substrates. It is preferable in many applications that they be sprayed and when so applied give non-wrinkle finishes with good gloss and excellent alkali water and solvent resistance. These coating solutions are particularly valuable as automotive finishes.

The invention may be more fully understood by reference to the following examples. All parts and percentages are by weight unless otherwise indicated. These examples are illustrative of certain embodiments designed to teach those skilled in the art how to practice the invention and to represent the best mode contemplated for carrying out the invention and are not intended to limit the scope of the invention in any way.

EXAMPLE 1

This example illustrates the preparation of an alcoholated urethane oil as an intermediate in the preparation of the vinylated urethane oil products of this invention.

The first four of the following ingredients were charged to a 3-neck flask equipped with a stirrer, themometer, condenser, and $N_2$ inlet tube.

| | |
|---|---|
| (1) Safflower oil (non-break) | 261.5 |
| (2) Dehydrated castor oil | 113.1 |
| (3) Pentaerythritol (mono) | 53.4 |
| (4) Calcium naphthanate 4% | 1.1 |
| (5) Toluenediisocyanate | 120.6 |
| (6) Naphtha | 428.0 |
| (7) Methyl Cellosolve | 22.3 |
| | 1,000.0 |

The first four ingredients were heated to a temperature of 480°–500° F. and held until the alcholysis product (hot) provided a clear solution in at least one part methanol. The reaction mass was then cooled to 160° F. and then the toluenediisocyanate (5) was then added in four increments at 15 minute intervals. The reaction was allowed to exotherm after the first increment of toluenediisocyanate but held at 190°–200° F. during the addition of subsequent increments and was held at that temperature for 15 minutes thereafter. The naphtha (6) was added in four increments at 15 minute intervals maintaining the temperature at about 200° F. The temperature was increased to 250° F. maximum after the last increment of solvent (6) entered the reaction mix and held until a viscosity of $Z_2$–$Z_4$ was obtained. The reaction mass was then cooled and diluted with methyl Cellosolve (7) and filtered. The constants of the batch were as follows:

| | |
|---|---|
| Percent nonvolatiles | 55.0 |
| Acid number | Essentially zero |
| Viscosity | X¼ |
| Color | 3+ |

EXAMPLE 2

This example illustrates the vinylation of the alcoholated urethane oil prepared in Example 1.

The first two of the following ingredients were charged to a 3-neck flask equipped with thermometer, $N_2$-inlet tube, stirrer, dropping funnel, and condenser.

| | |
|---|---|
| (1) Alcoholated urethane of Example | 585.0 |
| (2) Naphtha | 236.0 |
| (3) Methylmethacrylate | 59.3 |
| (4) Vinyltoluene | 91.3 |
| (5) Acrylonitrile | 24.4 |
| (6) Ditertiarybutylperoxide | 4.0 |
| | 1,000.0 |

The reaction mass was heated to reflux (about 324° F.) and then the unsaturated monomers (3), (4), (5), and (6) were added as a solution dropwise over a one hour period. Reflux was maintained till approximately 100% of the monomer was converted to polymer (or until a 49–50% NV is obtained). The reaction flask was then cooled and filtered.

The constants were as follows:

| | |
|---|---|
| Percent nonvolatiles | 49.5 |
| Acid number | Essentially zero |
| Viscosity | X¾. |
| Color | 3. |

EXAMPLES 3–7

These examples illustrate variations of the above Examples based on changes in reactants, proportions and reaction conditions, as indicated.

EXAMPLE 3

Example 2 was repeated except that acrylamide was substituted for acrylonitrile (5) and added initially to the reaction vessel with the alcoholated urethane of Example 1 and the naphtha (2). The reaction conditions were similar to those of Example 2. The final product had the following constants.

| | |
|---|---|
| Percent nonvolatiles | 50.0 |
| Viscosity | Q½ |
| Color | 3+ |

EXAMPLE 4

Example 1 was repeated with the following changes:
  (a) 4,4'-methylenebis (cyclohexylisocyanate) was substituted for the toluene diisocyanate (5) and added as a solution in 120.6 grams of the total charge of naphtha (6).
  (b) The alcoholysis product was cooled to 252° F. where the incremental addition of the 4,4'-methylenebis (cyclohexylisocyanate) was started. The temperature was allowed to climb gradually to 300° F. during the addition of the diisocyanate solution.
  (c) The balance of the naphtha charge, 307.4 grams, was added in bulk 15 minutes after the last increment of diisocyanate solution entered the reaction mix.
  (d) The temperature was allowed to rise to reflux, 340° F., where it was held for one hour.
  (e) The mass was cooled to 248° F. for the addition of the methyl Cellulosolve (7) and the product filtered.

The constants of this batch were as follows:

| | |
|---|---|
| Percent nonvolatiles | 55.8. |
| Acid number | Essentially zero. |
| Viscosity | X½. |
| Color | 4. |

EXAMPLE 5

Example 3 was repeated except that, (a) the alcoholated urethane of Example 4 was substituted for the alcoholated urethane of Example 1 and, (b) one half of the ditertiary-butylperoxide (6) charge was added to the initial reaction charge; the other one half was added to the liquid vinyl monomer mix.

The final product had the following constants:

| | |
|---|---|
| Percent nonvolatiles | 49.9. |
| Acid number | Essentially zero. |
| Viscosity | V½. |
| Color | 3½. |

EXAMPLE 6

Example 1 was repeated except that regular mineral spirits was substituted for the naphtha (6) and the reaction mix held until a viscosity of $Z_1$–$Z_3$ was obtained prior to final cooling and dilution with methyl Cellulosolve (7).

The final constants of this batch were as follows:

| | |
|---|---|
| Percent nonvolatiles | 55.7. |
| Acid number | Essentially zero. |
| Viscosity | X+. |
| Color | 3½. |

EXAMPLE 7

Example 2 was repeated except that, (a) the reaction was processed to give 54–55% nonvolatiles after conversion of monomers to polymer, (b) methacrylonitrile was substituted for acrylonitrile (5) and (c) the amounts of ingredients were changed as follows:

(1) Alcoholated urethane of Example 1 _____ 644.0
(2) Naphtha _____ 158.9
(3) Methylmethacrylate _____ 65.2
(4) Vinyltoluene _____ 100.2
(5) Methacrylonitrile _____ 26.7
(6) Ditertiarybutylperoxide _____ 5.0
　　　　　　　　　　　　　　　　　　　　　1,000.0

The final product was diluted to 50% nonvolatiles with naphtha and filtered. The constants of this batch were as follows:

Percent nonvolatiles _____ 50.0
Acid number _____ Essentially zero
Viscosity _____ 1¼
Color _____ 4

EXAMPLE 8

This example illustrates the preparation of a paint and compares the coating properties of the paint made from the resin of Example 2 versus a commercially available control.

The control resin was a short oil, acrylic modified, alkyd copolymer of the type commonly used for automotive refinish applications. The paints were made according to procedures well known to those skilled in this art. The pigment/binder ratio was 0.8/1 and the total nonvolatiles 55%. Both resins were processed into white automotive enamels according to the following formulation:

A.—Preparation of the Mill Base

| | | Grams | | Percent |
|---|---|---|---|---|
| 1 | Titanium dioxide (Du Pont R-902HG) | 250.00 | | 55.50 |
| 2 | Resin at 50% nonvolatiles | 150.00 | Resin solids | 16.70 |
| | | | Solvent | 16.70 |
| 3 | V.M. & P. naphtha | 50.00 | | 11.10 |
| | Total | 450.00 | | 100.00 |

B.—Preparation of the Final Enamel

| | | Grams | | Percent |
|---|---|---|---|---|
| 1 | Mil base | 198.00 | Pigment | 24.41 |
| | | | Resin solids | 7.35 |
| | | | Solvent | 12.20 |
| 2 | Resin at 50% nonvolatiles | 208.00 | Resin solids | 23.14 |
| | | | Solvent | 23.14 |
| 3 | V.M. & P. naphtha | 44.00 | | 9.76 |
| | Total | 450.00 | | 100.00 |

0.2% lead and 0.05% manganese were added as metal driers in the form of lead and manganese naphthanate solutions. Other well known driers, e.g., zirconium octoate and cobalt naphthanate may also be used.

Three mil wet films of these enamels were coated on glass and metal panels and aged at constant (77° F.) temperature and constant (50%) relative humidity conditions. The evaluations were conducted according to procedures well known to those skilled in this art. The Zapon, sward hardness, gloss, solvent resistance, foil free time, alkali resistance and Tukon hardness were conducted on glass. The adhesion and GE impact readings were obtained on tinplate. The lifting and wrinkling properties were obtained on both glass and metal. Results are summarized in Table I below.

The lift and wrinkling resistance properties were determined by applying a 3 mil wet paint to a series of glass and metal panels then topcoating this prime coat with the same paint (self recoating) at various intervals. The topcoats were applied to the primer at 4 hours, 7 hours, 24 hours, 2 days, 3 days and one week during the aging of the prime coat. Along with the paint of Example 2 there were included in the study three commercially available paints of the types commonly used in automotive refinishing applications. Two of these controls were vinylated alkyd copolymers including the Control A paint and a short oil, pure alkyd.

The paint made from Example 2 showed a very slight wrinkling from the 4 hour topcoat application and no evidence of lifting or wrinkling after the 7 hour, 24 hour, 2 day, 3 day and one week topcoat application. All the commercial controls showed from moderate to severe wrinkling at the early 4 hour and 7 hour recoating intervals and from slight to moderate wrinkling at the 24 hour, 2 day, 3 day and one week recoating intervals.

GE impact and adhesion readings were taken after one week and one month of aging. The xylol, mineral spirits and alkali (5% sodium hydroxide solution) tests were performed on two week old films. The xylol and mineral spirits resistance was determined by wiping crosswise over the film with a cloth previously dipped into the respective solvents. The number of wipes that were needed to effect or mar the appearance of the film to any degree were recorded. The more wipes needed to mar the film the more resistant was the film to the respective solvent.

The alkali resistance was measured by placing seven drops of a 5% sodium hydroxide solution onto the surface of the film, covering the alkali spot with a watch glass for 10 minutes, removing the watch glass, blotting the spot then drawing a spatula through the blotted area to determine what effect, if any, the alkali had on the paint film. Readings were recorded on a gradient scale from zero to ten–zero and one indicating no effect or slight effect to the film and ten indicating a very severe effect.

Although this invention has been described in considerable detail with reference to certain preferred embodiments, it will be understood that variations and modifica-

TABLE I

| Product | Pass 200 GM Zapon (min.) | Pass 500 GM Zapon (min.) | Foil Free time (hr) | 7 hr. | 24 hr. | 1 wk. | 2 wks. | 60°/20° gloss | Alkali resist |
|---|---|---|---|---|---|---|---|---|---|
| Example 2 | 2.50 | 60 | 3 | 16 | 22 | 46 | 48 | 90=77 | 1 |
| Control A | 60 | 105 | 4 | 10 | 14 | 32 | 32 | 90=77 | 8 |

| Product | Adhesion | | GE impact | | Tukon hardness | | Xylol resist | | MS resist | |
|---|---|---|---|---|---|---|---|---|---|---|
| | 1 wk. | 1 mo. | 1 wk. | 1 mo. | 1 wk. | 1 mo. | Wipes | Mar | Wipes | Mar |
| Example 2 | Good | Good | 2 | 2 | 7.13 | 9.25 | 5 | Slight | 10 | No effect. |
| Control A | Fair | Fair | 1 | 1 | 4.11 | 4.71 | 1 | Heavy | 2 | Heavy. |

What is claimed is:

1. A process for forming polyaddition products comprising the steps of:
   (1) reacting 30% to 60% by weight of a drying oil at least 5% of said oil containing conjugated double bonds, with 2% to 25% of an aliphatic polyhydric alcohol, 75% to 100% of said polyhydric alcohol having at least 3 hydroxyl groups, at a temperature from about 400° F. to 600° F.; and then
   (2) adding up to 30% by weight of an organic polyisocyanate and reacting at a temperature from about 100° F. to 400° F.; and then
   (3) adding 15% to 60% by weight of an ethylenically unsaturated monomer and an addition polymerization catalyst and polymerizing the mixture so formed at a temperature from about 200° F. to 400° F.

2. The process of claim 1, in which said drying oil is selected from the group consisting of safflower oil, dehydrated castor oil and mixtures thereof; said organic polyisocyanate is selected from the group consisting of toluene diisocyanate and 4,4' - methylene - bis(cyclohexylisocyanate); said polyhydric alcohol is selected from the group consisting of pentaerythritol and glycerol; and said ethylenically unsaturated monomer is selected from the group consisting of styrene, lower alkyl and chloro-substituted styrenes, lower alkanol esters of acrylic and methacrylic acid, acrylonitrile, acrylamide and methacrylonitrile.

3. The process of claim 2, in which said drying oil is a mixture of safflower oil and dehydrated castor oil; said polyisocyanate is toluene diisocyanate; said polyol is pentaerythritol and said ethylenically unsaturated compound is a mixture of vinyl toluene, acrylonitrile and methyl methacrylate.

4. A composition of matter comprising the reaction product of:
   (A) 30% to 60% by weight of a drying oil where at least 5% of the oil is an oil containing conjugated double bonds;
   (B) 2% to 25% by weight of an aliphatic polyhydric alcohol, 75% to 100% by weight of said alcohol having at least 3 hydroxyl groups;
   (C) up to 30% of an organic polyisocyanate; and
   (D) 15% to 60% of an ethylenically unsaturated monomer;
   said reaction product being obtained by:
   (1) forming an alcoholate of the ingredients A and B;
   (2) reacting said alcoholate with the organic polyisocyanate B, and;
   (3) polymerizing the reaction product of step 2 with said ethylenically unsaturated monomer D.

5. The composition of claim 4 in which said drying oil is selected from the group consisting of safflower oil, dehydrated castor oil and mixtures thereof; said organic polyisocyanate is selected from the group consisting of toluene diisocyanate and 4,4'-methylene-bis-(cyclohexylisocyanate); said polyhydric alcohol is selected from the group consisting of pentaerythritol and glycerol; and said ethylenically unsaturated monomer is selected from the group consisting of styrene, lower alkyl and chloro-substituted styrenes, lower alkanol esters of acrylic and methacrylic acid, acrylonitrile, acrylamide and methacrylonitrile.

6. The composition of claim 5 in which said drying oil is a mixture of safflower oil and dehydrated castor oil; said polyisocyanate is toluene diisocyanate; said polyol is pentaerythritol and said ethylenically unsaturated monomer is a mixture of vinyl toluene, acrylonitrile and methyl methacrylate.

7. The composition of claim 4 in which said drying oil is a mixture of safflower oil and dehydrated castor oil; said polyisocyanate is 4,4'-methylene-bis-(cyclohexylisocyanate); said polyol is pentaerythritol and said ethylenically unsaturated monomer is a mixture of vinyl toluene, acrylamide and methyl methacrylate.

References Cited
UNITED STATES PATENTS

| | | | |
|---|---|---|---|
| 2,358,475 | 9/1944 | Pratt et al. | 106—252 |
| 2,609,349 | 9/1952 | Cass | 260—23 |
| 3,455,857 | 7/1969 | Holzrichter | 260—22 |

DONALD E. CZAJA, Primary Examiner

D. J. BARRACK, Assistant Examiner

U.S. Cl. X.R.

117—132, 161